United States Patent
Yu

(10) Patent No.: US 9,600,940 B2
(45) Date of Patent: Mar. 21, 2017

(54) METHOD AND SYSTEMS FOR PROCESSING 3D GRAPHIC OBJECTS AT A CONTENT PROCESSOR AFTER IDENTIFYING A CHANGE OF THE OBJECT

(71) Applicant: Kin Kwok Yu, Carlsbad, CA (US)

(72) Inventor: Kin Kwok Yu, Carlsbad, CA (US)

(73) Assignee: Kalloc Studios Asia Limited, Hong Kong (HK)

( * ) Notice: Subject to any disclaimer, the term of this patent is extended or adjusted under 35 U.S.C. 154(b) by 148 days.

(21) Appl. No.: 13/858,324

(22) Filed: Apr. 8, 2013

(65) Prior Publication Data

US 2014/0304662 A1    Oct. 9, 2014

(51) Int. Cl.
G06T 19/20 (2011.01)
G06F 9/50 (2006.01)
G06F 9/54 (2006.01)

(52) U.S. Cl.
CPC ............ G06T 19/20 (2013.01); G06F 9/5027 (2013.01); G06F 9/546 (2013.01); G06F 2209/548 (2013.01); G06T 2219/024 (2013.01); G06T 2219/2021 (2013.01)

(58) Field of Classification Search
CPC ......... G06T 15/00–15/87; G06T 17/00–17/30; G06T 19/00–19/20; G06T 2219/024; G06F 17/50–17/5095
See application file for complete search history.

(56) References Cited

U.S. PATENT DOCUMENTS

| | | | |
|---|---|---|---|
| 7,266,616 B1* | 9/2007 | Munshi | G06T 15/00 709/246 |
| 8,136,033 B1* | 3/2012 | Bhargava et al. | 715/249 |
| 2003/0030643 A1* | 2/2003 | Taylor et al. | 345/531 |
| 2003/0193528 A1* | 10/2003 | Stegbauer et al. | 345/853 |
| 2004/0107291 A1* | 6/2004 | Gamo | G06F 9/445 709/232 |
| 2006/0036756 A1* | 2/2006 | Driemeyer | G06F 17/3089 709/231 |
| 2008/0140732 A1* | 6/2008 | Wilson | G06F 17/3023 |
| 2008/0255809 A1* | 10/2008 | Ran et al. | 703/1 |
| 2009/0177454 A1* | 7/2009 | Bronstein | G06T 17/20 703/11 |
| 2013/0120368 A1* | 5/2013 | Miller | G06T 15/00 345/419 |
| 2013/0131840 A1* | 5/2013 | Govindaraj et al. | 700/19 |

* cited by examiner

*Primary Examiner* — Daniel Hajnik

(57) ABSTRACT

Method and systems for processing at least one three-dimensional (3D) graphic object include: identifying a change of 3D graphic objects, creating a message, assigning a unique identifier; and forwarding the message and the unique identifier to a scene engine. The change is made by an authoring tool. The message is embedded with change information corresponding to the change. The scene engine functions can be performed by the same or a different computing device as the computing device performing the authoring tool.

14 Claims, 6 Drawing Sheets

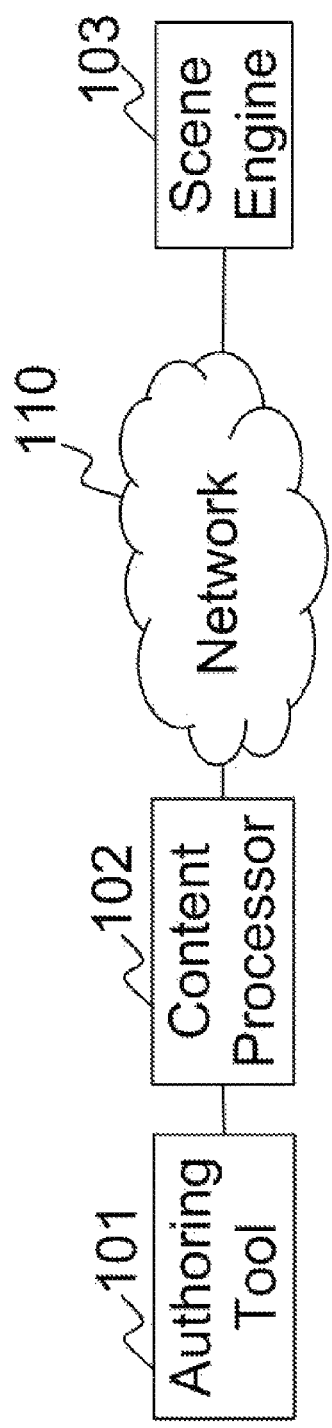
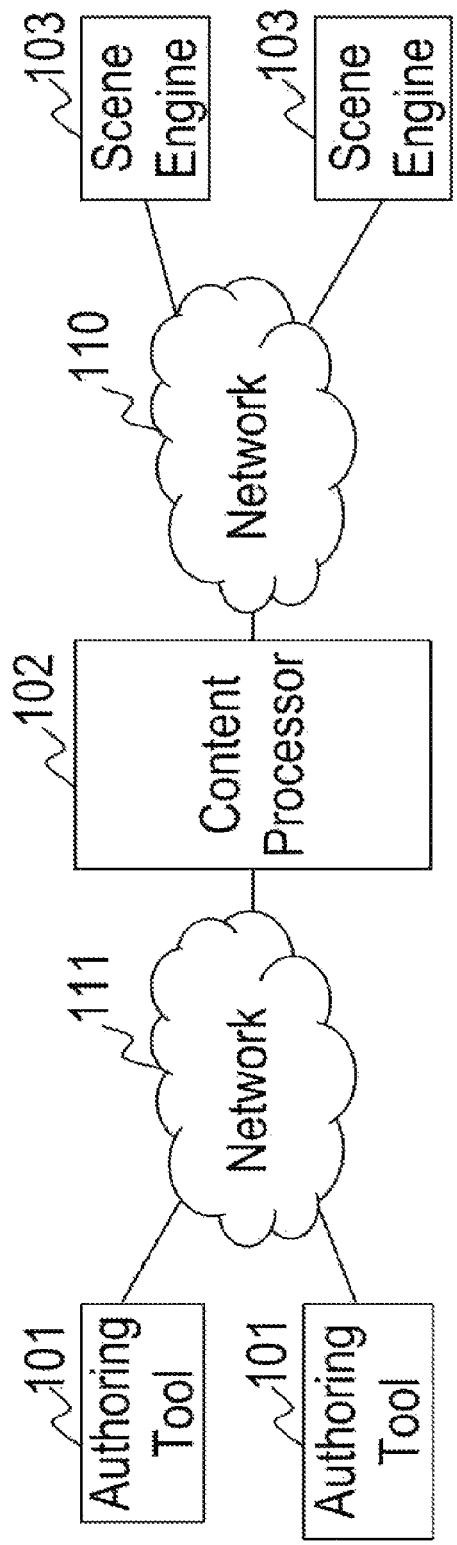
FIG. 1A
FIG. 1B

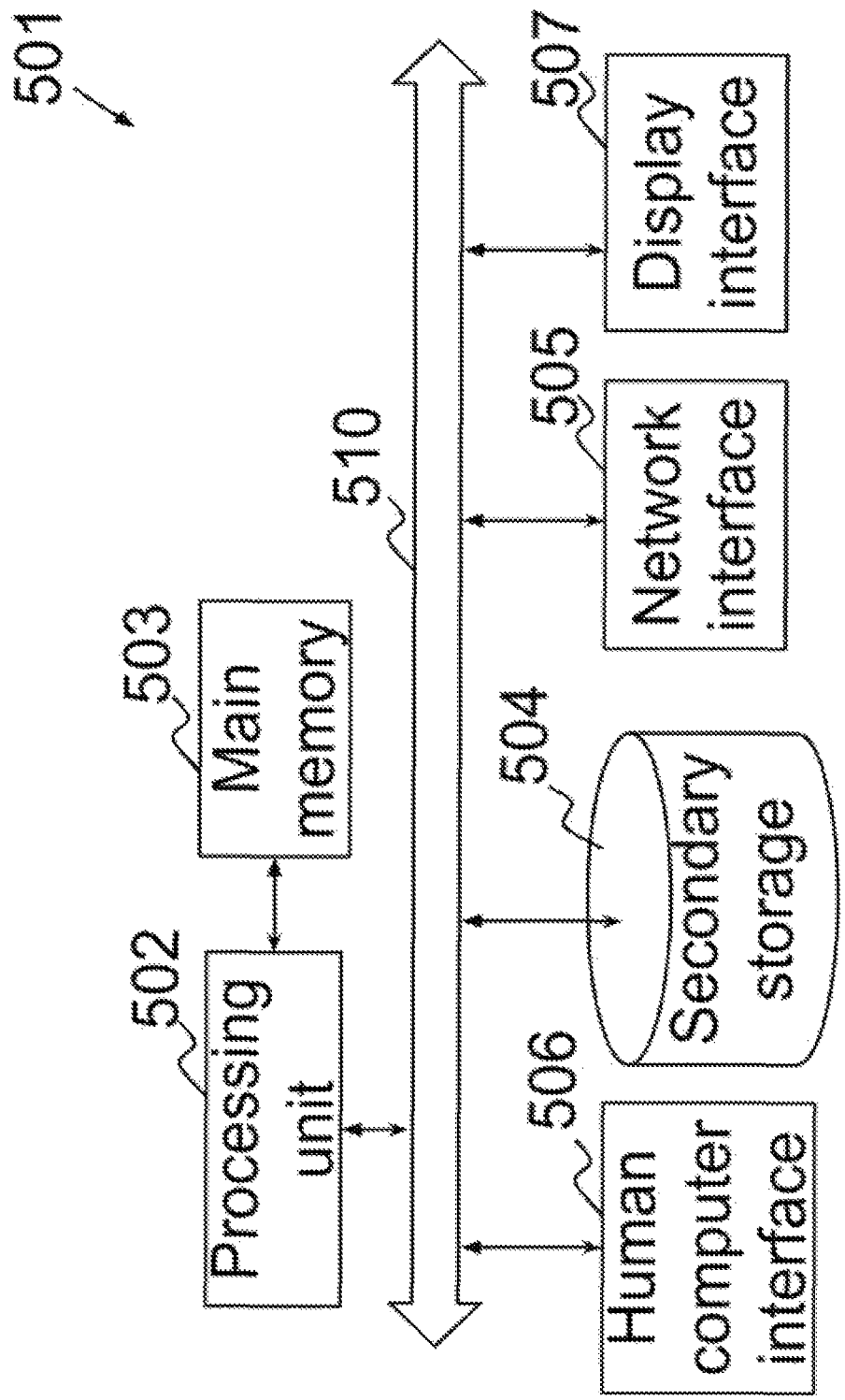

METHOD AND SYSTEMS FOR PROCESSING 3D GRAPHIC OBJECTS AT A CONTENT PROCESSOR AFTER IDENTIFYING A CHANGE OF THE OBJECT

FIELD OF THE INVENTION

The present invention relates to processing of 3D graphic objects. More specifically, the present invention relates to a method for processing and displaying 3D graphic objects, which are being changed in the same computing device or different computing device for authoring changes.

BACKGROUND OF THE INVENTION

Currently, 3D objects created in or modified by scene engines and/or object authoring tools such as 3DMax and Maya have to go through many stages before the changes in scene or objects are reflected at a scene display application, such as game developer software or user's software, including:

exporting the specific files of the 3D modeling tools into binary files that are required by the applications;

baking lighting information and produce application specific lighting information;

optimizing file packing for fast loading and streaming operation;

inserting physics data for object association with the model such as convex hull, or primitive creations;

additional application data association such as Artificial Intelligence (AI) path finding or obstacle avoidance;

shader compilations; and

Level of Detail (LOD) generation.

SUMMARY OF THE INVENTION

A three dimensional (3D) scene is composed of many 3D graphic objects, including background, skinning, mesh, texture, lighting, shader, texture lighting, coordination, materials, rendering, vertex, and camera, changes in 3D graphic objects are forwarded to a content processor and then are sent to a scene engine after processing is performed by the content processor. The changes in 3D graphic objects are created by at least one authoring tool. The scene engine is then able to interact with the changes in 3D graphic objects. It is possible that an authoring tool is also a scene engine, such that the authoring tool can interface with the changes in 3D graphic objects that are created by it or by other authoring tools.

There are myriad ways for a 3D graphic object to be changed. For example, an authoring tool may change the shape of object, the size of a 3D graphic object, the physical model applied to a 3D graphic object, the mesh of a 3D graphic object, the texture of a 3D graphic object, the lighting of a 3D graphic object, the location of a 3D graphic object in a scene, the light used in a scene, the number of 3D objects placed in a scene, the camera angle of the scene, the camera angle of an object, the texture of a 3D graphic object, shaders, skinning etc. In one variant, there are multiple authoring tools changing objects at the same time. For example, an authoring tool may change the mesh of a 3D graphic object and another authoring tool may change the light of a scene. All these changes in 3D graphic objects are then forwarded from the authoring tool to the content processor.

BRIEF DESCRIPTION OF THE DRAWINGS

Further features and advantages of the present invention will become apparent from the following detailed description, taken in combination with the appended drawings, in which:

FIG. 1A illustrates a deployment topology of a content processor, an authoring tool and a scene engine.

FIG. 1B illustrates a deployment topology of content processor, a plurality of authoring tools and a plurality of scene engines.

FIG. 5 is a block diagram of an example system architecture that can be utilized to implement the systems and methods described in this application.

DETAILED DESCRIPTION

Figure 1C:
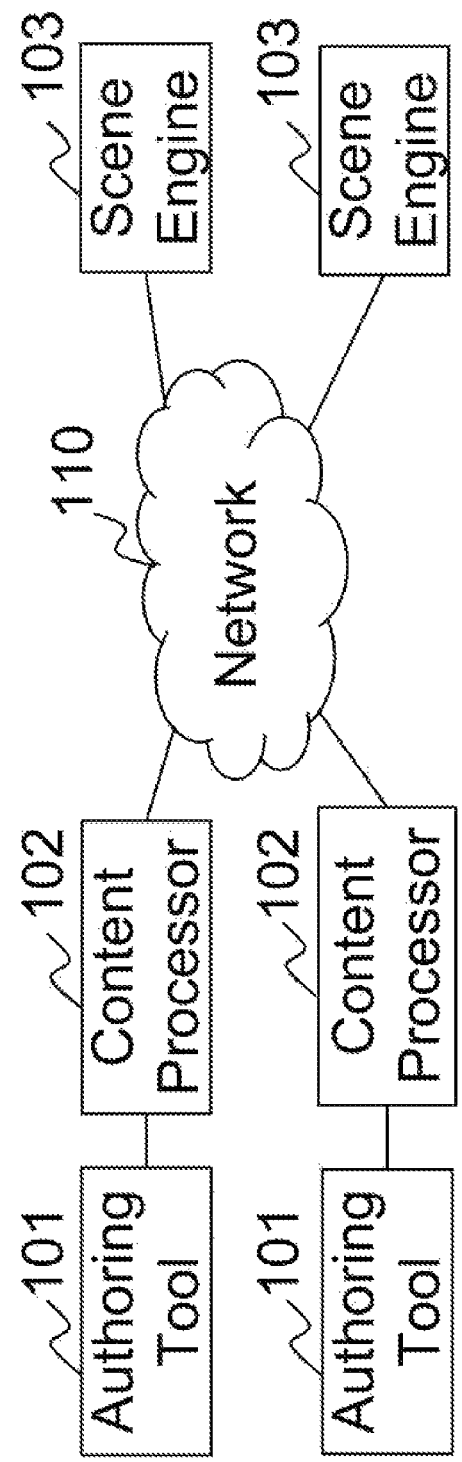
FIG. 1C illustrates a deployment topology of a plurality of content processors, a plurality of authoring tools and a plurality of scene engines.

The ensuing description provides preferred exemplary embodiment(s), and is not intended to limit the scope, applicability or configuration of the invention. Rather, the ensuing description of the preferred exemplary embodiment(s) will provide those skilled in the art with an enabling description for implementing a preferred exemplary embodiment of the invention. It is understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. In other instances, well-known processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" or "computer readable storage medium" may represent one or more devices for storing data, including read only memory (ROM), random access memory (RAM), magnetic RAM, Flash, non-volatile core memory, magnetic disk storage mediums, optical storage mediums, flash memory devices and/or other machine readable mediums for storing information. The term "computer readable storage medium" includes, but is not limited to, portable or fixed storage devices, optical storage devices, and various other mediums capable of storing, containing or holding instruction(s) and/or data. A queue may be implemented by a section or a plurality of sections in a storage medium.

Furthermore, embodiments may be implemented by hardware, software, virtual machine, cloud computing, firmware, middleware, microcode, hardware description languages, or any combination thereof. When implemented in software, firmware, middleware or microcode, the program code or code segments to perform the necessary tasks may be stored in a machine readable medium such as storage medium. A processing unit(s) may perform the necessary tasks. A processing unit(s) by a CPU, an ASIC semiconductor chip, a semiconductor chip, a logical unit, a digital processor, an analog processor, a FPGA or any processor that is capable of performing logical and arithmetic functions. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or via any suitable means including memory sharing, message passing, token passing, network transmission, etc.

A three dimensional scene used in computer game, video game, computer-aided design, movie development and other systems contains a plurality of 3D graphic objects. Background, skinning, mesh, texture, shader, texture lighting, coordination, materials, rendering, camera and other properties of 3D graphic objects are used, for example, by scene engine to generate 3D virtual scenes on the display screen of a computing device.

FIG. 1A illustrates one of the embodiments of the present invention. The system of the embodiment includes content processor 102, authoring tool 101 and scene engine 103. Content processor 102 processes information and changes information of scenes and 3D graphic objects received from authoring tool 101. Then content processor 102 processes the information and changes information and forwards messages corresponding to the information or change information to scene engine 103. Content processor 102 can be implemented by a program on a computing device, including laptop computer, desktop computer, tablet computer, and mobile phone.

Authoring tool 101 allows the creation, modification and deletion of 3D graphic objects. Authoring tool 101 receives an input from a human being and displays 3D graphic objects to the human being through the authoring tool. Thus authoring tool 101 has an inputting device and can be implemented by programming a computing device, including laptop computer, desktop computer, tablet computer, and mobile phone.

Content processor 102 processes messages received from authoring tool 101 and can be implemented by programming a computing device, including laptop computer, desktop computer, tablet computer, and mobile phone.

Scene engine 103 allows the viewing of a 3D scene based on the 3D graphic objects, and changes of 3D graphic objects, therefore the entire art asset creation process can be viewed almost simultaneously as changes of objects occur in authoring tool 101. Thus this speeds up 3D scene development process, such as a game development process.

There are myriad ways for a 3D graphic object to be changed. For example, authoring tool 101 may change the shape of a 3D graphic object, the size of a 3D graphic object, the physical model applied to a 3D graphic object, the location of a 3D graphic object in a 3D scene, the coordination of a 3D graphic object in a 3D scene, the light used in a 3D scene, the number of 3D graphic objects placed in a 3D scene, the camera angle of the scene, the camera angle of a 3D graphic object, the skinning of a 3D object, the mesh of a 3D object, the materials of a 3D graphic object, the shader of a 3D graphic object, the rendering of a 3D graphic object, the texture of a 3D graphic object, etc.

According to one of the embodiments of the present invention, the system of the embodiment includes authoring tool 101 and content processor 102. Content processor 102 and scene engine 103 communicate with each other through network 110, which may include a local area network, a wide area network, the Internet, an intranet, and an extranet. Authoring tool 101 and content processor 102 may be different threads of processes running inside the same computing device.

According to one of the embodiments of the present invention, the system of the embodiment includes content processor 102 and scene engine 103. Content processor 102 and authoring tool 101 communicate with each other through network 110, including local area network, wide area network, the Internet, an intranet and an extranet. Content processor 102 and scene engine 103 are different threads of processes running inside the same computing device.

According to one of the embodiments of the present invention, the system of the embodiment includes authoring tool 101, content processor 102, and scene engine 103 and can be implemented by programming one computing device or a plurality of computing devices. For example, authoring tool 101 and content processor 102 are implemented by programming one desktop computer while scene engine 103 is implemented by programming a mobile phone. In another example, authoring tool 101 is implemented by programming a desktop computer, content processor 102 is implemented by programming a server hosted at a cloud computing service provider, and scene engine 103 is implemented by programming a mobile phone. In another example, authoring tool 101, content processor 102 and scene engine 103 are all implemented by programming a tablet computer, and therefore can be communicating through a bus system of the tablet. When any two or all of authoring tool 101, content processor 102, and scene engine 103 are implemented by programming in a same computing device, the communications among authoring tool 101, content processor 102 and scene engine 103 that are implemented by programming in the same computing device do not need to be performed through communications networks, but through other communications technologies, including inter-process communication, inter-thread communication, bus communication, and serial communication.

For illustration purposes, when authoring tool 101 changes the shader of a 3D graphic object, the 3D graphic object changes are then forwarded to or captured by content processor 102 for processing. Content processor 102 then forwards one of more messages containing the processed 3D graphic object and/or change information for one or more scene engine 103 to display the updated 3D graphic object. In one variant, the forwarding of one or more messages containing processed 3D graphic object and/or change information to scene engine 103 from content processor 102 is based on a request received scene engine 103.

FIG. 1B illustrates one of the embodiments of the present invention. The system of the embodiment includes a plurality of authoring tools 101, content processor 102 and a plurality of scene engines 103. The plurality of authoring tools 101 communicates with content processor 102 through network 111. The plurality of authoring tools 101 changes one or more 3D graphic objects at the same time. For illustration purposes, a first authoring tool 101 changes the mesh of an object and a second authoring tool 101 changes the light of a 3D graphic object. All these 3D graphic object changes are then forwarded to or captured by content processor 102 for processing through network 111. Content processor 102 then forwards one of more messages containing the processed 3D graphic object and/or change information for one or more scene engine 103 to display the 3D graphic object through network 110. The communication between authoring tool 101 and content processor can be conducted by using Internet Protocol (IP) packets. The IP packets can be transmitted by authoring tool 101 using User Datagram Protocol (UDP) or Transmission Control Protocol (TCP).

FIG. 1C illustrates one of the embodiments of the present invention. The system of the embodiment includes a plurality of authoring tools 101, a plurality of content processors 102 and a plurality of scene engines 103. The plurality of authoring tools 101 changes one or more 3D graphic objects at the same time. For illustration purposes, a first authoring tool 101 changes the texture of a 3D graphic object and a second authoring tool 101 changes the position of the same 3D graphic object. The 3D graphic object change made by the first authoring tool 101 is then forwarded to or captured by a first content processor 102 for processing. Similarly, the 3D graphic object change made by the second authoring tool 101 is then forwarded to or captured by a second content processor 102 for processing. The first and second content processors 102 then forwards one of more messages containing the processed information for one or more scene engine 103 to display the 3D graphic object.

Persons skilled in the art will recognize that a server system, such as a data processing system, including a CPU, memory, I/O, program storage, a connecting bus, and other appropriate components, could be programmed or otherwise designed to facilitate the practice of the invention, including authoring tool 101, content processor 102 and scene engine 103. Such authoring tool 101, content processor 102 and scene engine 103 would include appropriate program means for executing the operations of the invention.

Methods

Figures 2A, 2B:
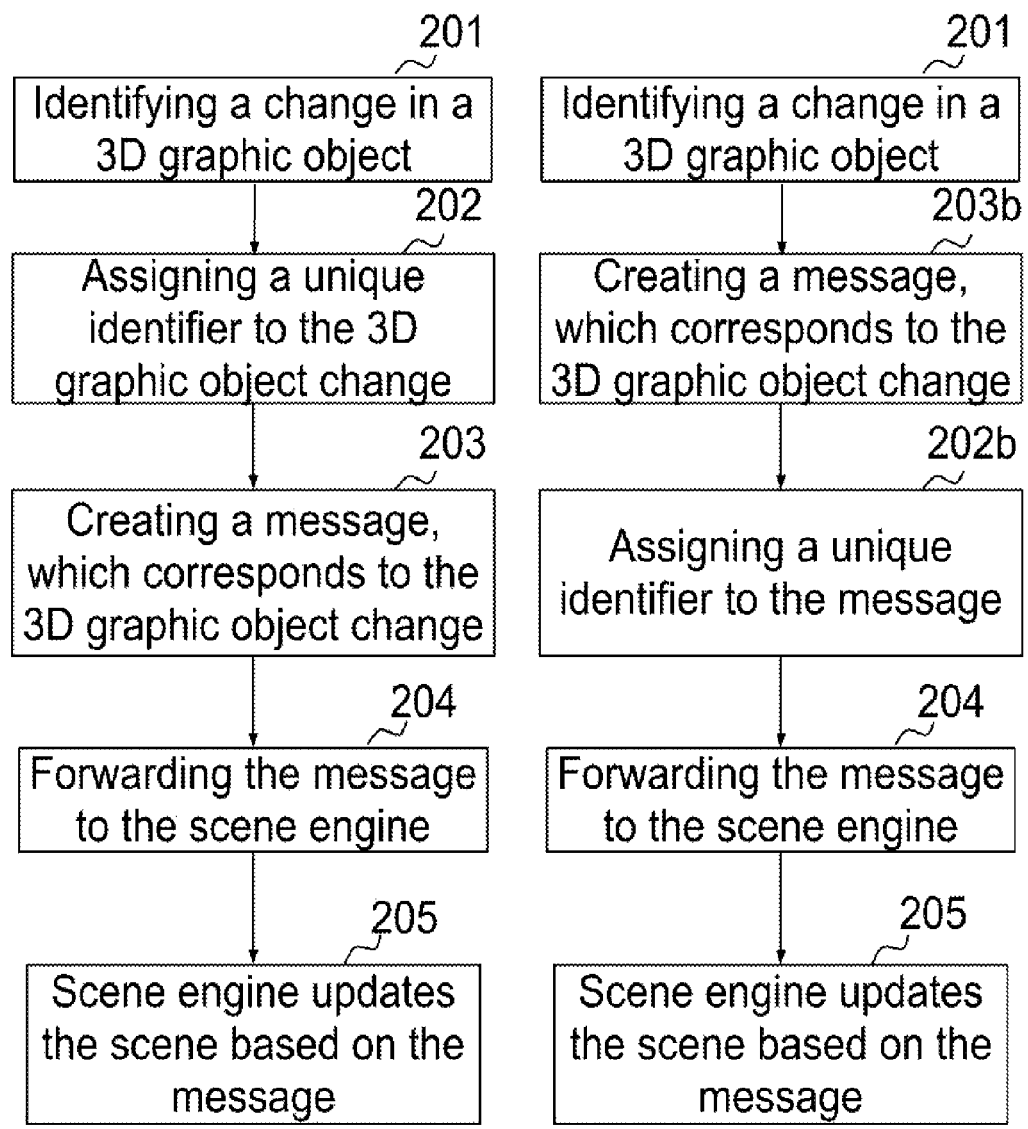
FIG. 2A illustrates a flow chart of one of the methods of processing a change in a 3D graphic object.
FIG. 2B illustrates a flow chart of one of the methods of processing a change in a 3D graphic object.

FIG. 2A illustrates one of the embodiments of the present invention. FIG. 2A, for illustration purposes, is viewed in conjunction with FIG. 1. When content processor 102 has identified a change in a 3D graphic object at step 201, content processor 102 assigns a unique identifier to the change in the 3D graphic object at step 202. A message, corresponding to the change in the 3D graphic object, is then created and stored in a queue at content processor 102 at step 203. For illustration purposes, the message contains change information corresponding to the updated values of vertex, skinning, shaders, and textures. In another illustration, the message may contain updated information of the shape of 3D graphic object, the size of a 3D graphic object, the physical model applied to a 3D graphic object, the mesh of a 3D graphic object, the texture of a 3D graphic object, the lighting of a 3D graphic object, the location of a 3D graphic object in a scene, the light used in a scene, the number of 3D graphic objects placed in a scene, the camera angle of the scene, the camera angle of a 3D graphic object, the texture of a 3D graphic object, shaders, skinning etc. According to one of the embodiments of the present invention, the message contains the complete updated value of the 3D graphic object or change information of the 3D graphic object. Alternatively, the message contains only the value of the changed property of the 3D graphic object.

Content processor 102 then forwards the message to scene engine 103 at step 204. Scene engine 103 then updates the 3D scene based on the messages received at step 205. According to one of the embodiments of the present invention, content processor 102 optimizes the content of the message by reducing the complexity of the change in the 3D graphic object. For illustration purposes, the reduction of the complexity of the change in the 3D graphic object includes reducing vertex count by finding common vertexes, removing information that is only relevant for the authoring tool.

The identification at step 201 can be performed by content processor 102 using a software hook, such as an application programmable interface (API) to authoring tool 101. Therefore, when authoring tool 101 has made a change in a 3D graphic object, it can be notified to identify the change. Alternatively, according to one of the embodiments of the present invention, hash codes are calculated for 3D graphic objects. When the hash code of a 3D graphic object changes, it implies that there is a change in the 3D graphic object. Therefore, content processor 102 can identify the change. There are many techniques to calculate a hash code, including using cyclic redundancy check (CRC) and Secure Hash Algorithm (SHA). The hash code is calculated based on the serialized data of the 3D graphic object or the file of the 3D graphic object. Serialization of the change in the 3D graphic object is performed by converting a data structure, object state, or file of the change in the 3D graphic object into a format that can be stored and/or transmitted. The calculation of the hash code may take place when the scene or object stored at a computer readable storage medium is updated, or periodically.

The unique identifier to the change in the 3D graphic object is to assist the recognition of the change in the 3D graphic object. As there may be a large number of changes in the 3D graphic object in a short period of time or changes in a large number of 3D graphic objects, the unique identifier can assist content processor 102 or scene engine 103 to distinguish one change from another change.

The message created in step 203 can be in the form of a string or binary data. The change in the 3D graphic object and the unique identifier form part of the message. Therefore, the size of the message varies. According to one of the embodiments of the present invention, a message containing new coordination of a 3D graphic object may only consist of the x, y, z coordinate information and the corresponding unique identifier, and the size of this message may be in the range of from about ten bytes to one thousand bytes. For example, a message containing new image of a 3D graphic object may consist of binary data of the new image and the corresponding unique identifier, and the size of this message may be in the range of from about ten thousand bytes to one gigabyte. Further, according to one of the embodiments of the present invention, if there is lighting, texture, mesh, and camera information associated with the new image, the size of the message may be in the range of from one kilobyte to tens of gigabytes, preferably not more than ten megabytes due to the capability of state-of-art networks.

The forwarding of the message at step 204 may be performed by many techniques that are known to those skilled in the art. Those skilled in the art would appreciate that there are many techniques to forward a message between different processes in a computing device, different threads in a computing device, different virtual machines in a computing device, and different computing devices in a communication network. In one example, the message is embedded in an IP packet, and the IP packet is sent using the TCP protocol. In another example, the message is embedded in an IP packet, and the IP packet is sent using the TCP protocol through a cellular network.

According to one of the embodiments of the present invention, the forwarding of the message is by storing the message at a piece of common computer readable storage medium if authoring tool 101 and content processor 102 are implemented by programming the same computing device. According to one of the embodiments of the present invention, the forwarding of the message is by transmitting packets through a network with the message embedded inside. According to one of the embodiments of the present invention, the forwarding of the message is by transmitting packets with the message embedded inside in a computing device with virtual machine capability that authoring tool 101 is implemented by programming one virtual machine of the computing device and content processor 102 is implemented by programming another virtual machine of the computing device. For illustration purposes, the message can be embedded in an Internet Protocol (IP) packet and be forwarded using Transmission Control Protocol (TCP), User Datagram Protocol (UDP) or other protocols.

Scene engine 103 updates the scene at step 205 after receiving the message from content processor 102 by processing the change information contained in the message with the scene and 3D graphic objects it already has stored, and then displays an updated scene with 3D graphic objects if it is required to do so. If scene engine 103 does not possess the scene information or 3D graphic object information related to the change information contained in the message, scene engine 205 requests the scene information or 3D graphic object information from content processor 102 or other sources. According to one of the embodiments of the present invention, scene engine 205 displays the updated scene and/or 3D graphic object via authoring tool 101.

FIG. 2B illustrates one of the embodiments of the present invention. FIG. 2B, for illustration purposes, is viewed in conjunction with FIG. 1. Step 202 in FIG. 2A is replaced be step 202b in FIG. 2B and step 203 in FIG. 2A is replaced with step 203b in FIG. 2B. Further step 203b is before step 202b. At step 203b, a message is created corresponding to the change of a 3D graphic object. Then at step 202b, a unique identifier is then assigned to the message created at step 203b. Step 204 and step 205 in FIG. 2B perform substantially the same operations as step 204 and step 205 in FIG. 2A. In one variant, at step 204 in FIG. 2B, the unique identifier is sent along with the message by embedding both the message and the unique identifier in data packet(s) to scene engine 103. In another variant, the message is amended to include the unique identifier and then sent to scene engine 103.

Figure 3:
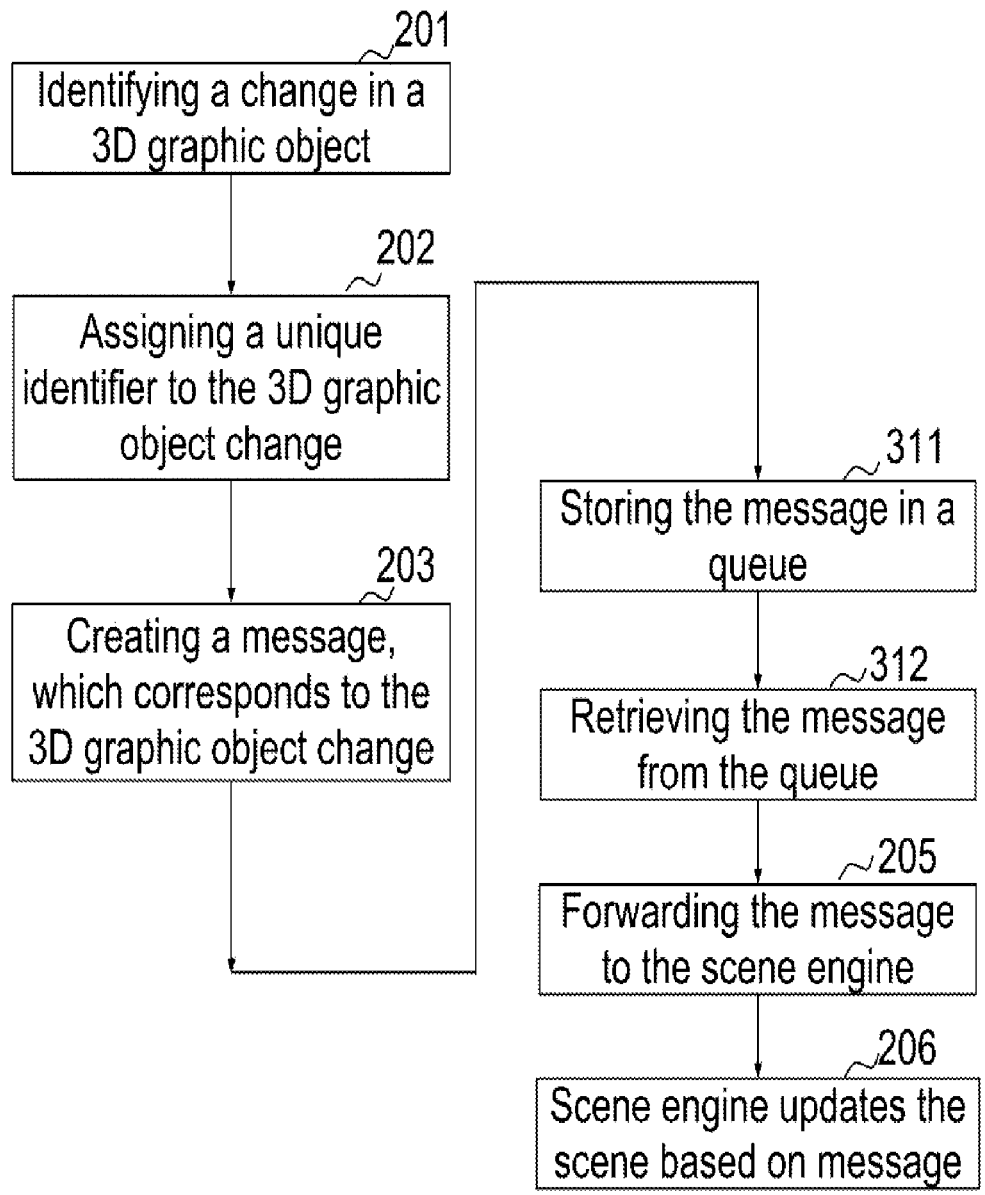
FIG. 3 illustrates a flow chart of one of the methods of processing a change in a 3D graphic object.

FIG. 3 illustrates one of the embodiments of the present invention. FIG. 3, for illustration purposes, is viewed in conjunction with FIG. 1. The differences between FIG. 3 and FIG. 2A are the additions of step 311 and step 312. After the message is created by content processor 102 at step 203, the message is first stored in a queue at step 311. The storage of the message is to allow the message to not be transmitted to scene engine 103 immediately after creation. There are many reasons why content processor 102 cannot or should not forward the message immediately to scene engine 103, including network capacity of network 110, processing capability of scene engine 103, processing capability of content processor 102, the message is outdated already, and the message is not a high priority message.

At step 312, the message is retrieved from the queue when content processor 102 determines to forward the message to scene engine 103 or when scene engine 103 informs content processor 102 that scene engine 103 is ready to accept message.

Similar to the embodiment of FIG. 2, the message is then forwarded to content processor 102 at step 205.

According to one of the embodiments of the present invention, when there is no more storage space in the queue or the queue size is more than a threshold value, the message that has been stored in the queue for the longest time is removed in order to have storage space to store the message that is just being created at step 203. Alternatively, a plurality of messages that have been stored in the queue are deleted in order to release the storage space. Alternatively, the message is discarded and not being stored, and therefore step 311 is omitted.

According to one of the embodiments of the present invention, when the message is created at step 203, a tag that categorizes the change in the 3D graphic object is also part of the message. The tag can be used by the content processor 102 or scene engine 103 to determine the type of the message. Content processor 102 can also use the tag to determine if the message contains the most updated change in the 3D graphic object and whether to delete messages that contain outdated change in the 3D graphic object.

According to one of the embodiments of the present invention, data received by content processor 102 from authoring tool 101 is processed by a shadow cache at content processor 102 prior to forwarding messages containing the data to scene engine 103. The data is retrieved in raw format from authoring tool 101. It then goes through initial checks to see if any changes have taken places since last processed. Once it is decided that an update is needed, the shadow cache will use a threaded system to process the data. The different values, such as vertex data, skinning data, shaders, and textures, will be parsed from the data. The data is optimized to produce the message. The optimizations include reducing vertex count by finding a common vertex. The optimization reduces the amount of data to be transfer and processed by scene engine 103.

According to one of the embodiments of the present invention, data received by content processor 102 from authoring tool 101 is categorized. The categorization is performed according to the unique identifier of the messages. Once the data is categorized, it is sent to be processed into the pipeline of scene engine 103. Scene engine 103 first reads the data from its pipeline into appropriate structures and creates data buffers either on the GPU memory or CPU memory of a computing device. The data retrieved from the data buffers is then put into a queue with a categorization tag and with a link to the original data from its pipeline. After the data retrieved from the data buffers has been validated as ready, it is considered to be active, and scene engine 103 deletes the original data from its pipeline. In one variant, scene engine 103 deletes the original data from its pipeline only after it is confirmed that the original data from its pipeline is not being used.

System

Figure 4:
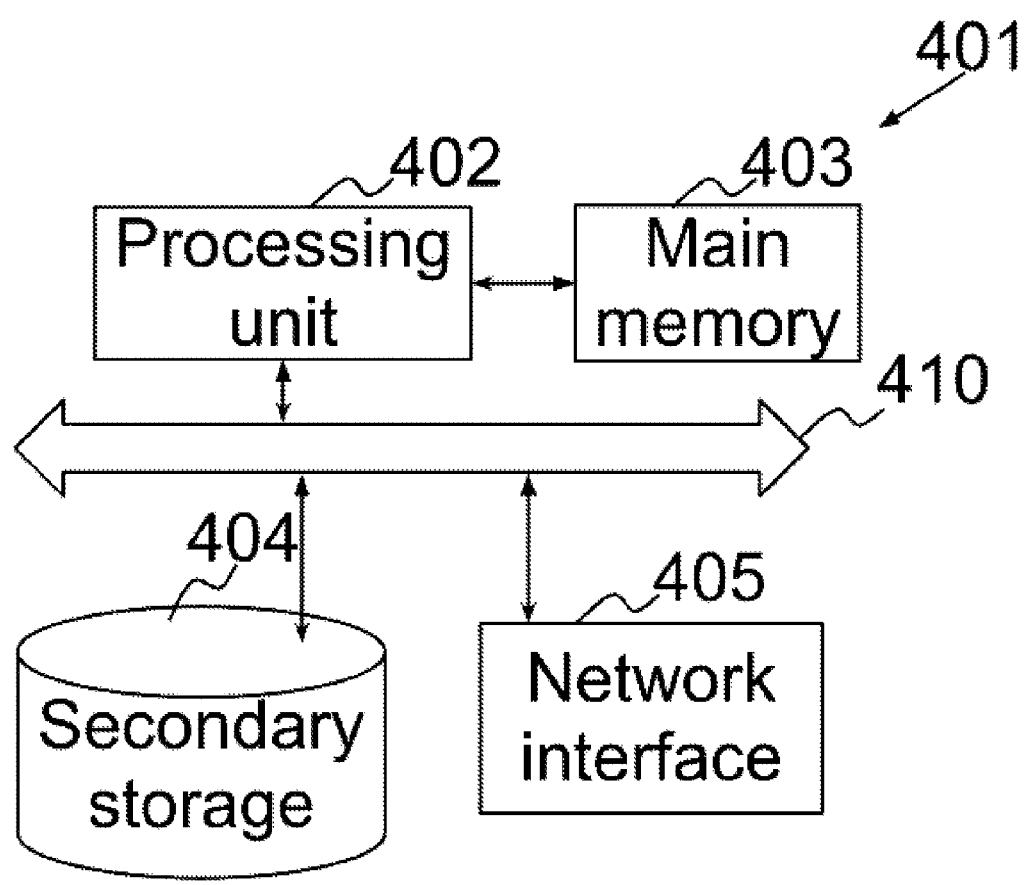
FIG. 4 is a block diagram of an example system architecture that can be utilized to implement the systems and methods described in this application.

FIG. 4 is a block diagram of an example content processor system architecture 401 that can be utilized to implement the systems and methods of content processor 102 described in reference to FIGS. 1-3. Content processor system 401 can, for example, be implemented in a computer device, such as any one of the personal computer devices, servers, desktops, laptops, tablets, mobile phones etc.

Example content processor system 401 includes processing unit 402, main memory 403, secondary storage 404, and network interface 405. Bus system 410, such as a data bus and a motherboard, can be used to establish and control data communication between the components 402, 404, and 405. Other example system architectures, however, can also be used. Main memory 403 may communicate with processing unit 402 using data bus 410 or a different bus.

Processing unit 402 can, for example, include one or more microprocessors having one or more processing cores. Main memory 403 can, for example, include a random access memory storage device, such as a dynamic random access memory, or other types of computer-readable medium memory devices. Main memory 403 can be used as a cache to store temporary data, registers, and instructions that are received from processing unit 402 or secondary storage 404. Secondary storage 404 can, for example, include one or more hard drives, a flash memory, and/or a read only memory, or other types of computer-readable medium memory devices.

Network interface 405 can, for example, include a wired or wireless network device operable to communicate data to and from network 110 or 111.

In an implementation, content processor system 401 includes instructions defining an operating system stored in main memory 403 and/or secondary storage 404. Example operating systems can include WINDOWS and LINUX based operating system, or other operating systems. Upon execution of the operating system instructions, access to various system objects is enabled. Example system objects include data files, applications, functions, etc.

Processing unit 402 performs the functions, according to the instruction stored in main memory 403 and/or secondary storage 404, of identifying changes of 3D graphic objects in authoring tool 101, processing the change information of 3D graphic objects received from authoring tool 101, reducing the complexity of the change information, embedding the change information in messages, and forwarding the messages to scene engine 103 via network interface 405. When processing unit 402 decides to store the message temporarily, processing unit 402 stores the message in main memory 403 and/or secondary storage 404. When processing unit 402 decides to forward the message stored earlier, processing unit 402 retrieves the message in main memory 403 and/or secondary storage 404 and forwards the messages to scene engine 103 via network interface 405.

Processing unit 402 further performs the functions, according to the instructions stored in main memory 403 and/or secondary storage 404, to assign a unique identifier to a change of 3D graphic objects. In one variant, processing unit 402 assigns a unique identifier to the message containing change information of 3D graphic objects.

Processing unit 402 may also regularly examine main memory 403 and/or secondary storage 404 for messages to decide whether to delete a message from main memory 403 and/or secondary storage 404 as a message may become outdated and/or there is not enough room in main memory 403 and/or secondary storage 404 to store new messages.

A compute device running authoring tool 101 needs at least one human computer interface (HCI) to interact with a user and at least one display user interface to display scenes or 3D graphic objects to the user to allow the user to author, create, edit, and delete scenes and 3D graphic objects.

A compute device running scene engine 103 needs at least one display user interface to display scenes or 3D graphic objects to the user to view the scenes and 3D graphic objects.

According to one of the embodiments of the present invention, when authoring tool 101 and scene engine 103 are not running in the same system with content processor 102, content processor system 401 does not need to have a human computer interface (HCI) to interact with a user and does need to have a display user interface to display scenes or 3D graphic objects to the user.

FIG. 5 is an illustration according to one of the embodiments of the present invention when authoring tool 101 is running in the same system with content processor 102. Content processor system 501 performs operations similar to the operations performed by content processor system 401. Example content processor system 501 includes processing unit 502, main memory 503, secondary storage 504, and network interface 505. In addition, content processor system 501 has human computer interface (HCI) 506 to interact with a user and display interface 507 to display scenes or 3D graphic objects to the user. Bus system 510, such as a data bus and a motherboard, can be used to establish and control data communication between the components 502, 504, 505, 506 and 507. Other example system architectures, however, can also be used. Main memory 503 may communicate with processing 502 using data bus 510 or a different bus.

Processing unit 502, main memory 503, secondary storage 504 and network interface 505 are implemented as processing unit 402, main memory 403, secondary storage 404 and network interface 405, respectively.

Display interface 507 can, for example, include a video card, a graphics accelerator card, a graphics processing unit (GPU) or a display adapter, and is configured to generate and output images to a display device. In one implementation, display interface 507 can be realized in a dedicated hardware card connected to bus system 510. In another implementation, display interface 507 can be realized in a graphics controller integrated into a chipset of bus system 510.

Example input devices connecting to HCI 506 can include a video camera, a keyboard, a mouse, a stylus, etc., and example output devices connecting to display interface 507 can include a display device, a LCD monitor, a 3D capable monitor, computer screen, projector, television screen, LED display, etc.

Processing unit 502 can also perform the functions according to the instructions stored in main memory 503 and/or secondary storage 504, of authoring tool 101. Inputs from a user are received by processing unit 502 through HCI interface 506 to author, create, edit and delete scenes and 3D graphic objects stored in main memory 503 and/or secondary storage 504. Processing unit 502 processes scenes and 3D graphic objects and then displays the scenes and 3D graphic objects to the user through display interface 507. Processing unit 502 can also offload certain arithmetic calculations to display interface 507 to accelerate the processing.

FIG. 5 is also an illustration according to one of the embodiments of the present invention when scene engine 103 is running in the same system with content processor 102. Content processor system 501 may have a human computer interface (HCI) to interact with a user and has a display user interface to display scenes or 3D graphic objects to the user. Therefore content processor system 501 can also perform the function of scene engine 103. HCI interface 506 is optional depending on whether a user's input is required. Display interface 507 is then used to show processed scenes and 3D graphic objects based on the change information contained in the messages received.

Processing unit 502 can also perform the function, according to the instructions stored in main memory 503 and/or secondary storage 504, of scene engine 103. Optional inputs from a user are received by processing unit 502 through HCI interface 506. Processing unit 502 processes change information of a 3D graphic object contained in a message and then displays the updated scenes and 3D graphic objects to the user through display interface 507. Processing unit 502 can also offload certain arithmetic calculations to display interface 507 to accelerate the processing.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

I claim:

1. A method for processing at least one three-dimensional (3D) graphic object at a content processor on a first computing device, the method comprising:
    identifying a change of the at least one 3D graphic object, wherein the change is made by an authoring tool, wherein the authoring tool is a program executed by the first computing device or by a second computing device;
    creating change information for the change;
    assigning a unique identifier, wherein the unique identifier is an identifier assigned to the change;
    creating a message, wherein the message is embedded with the change information, the unique identifier and a tag, wherein the tag is created by the content processor for categorizing the change and is used by the content processor or a scene engine to determine the type of the message;
    storing the message in a queue when the message is not ready for forwarding to the scene engine after creation;
    and retrieving the message from the queue when the message is ready for forwarding to the scene engine;
    discarding the message from the queue when the change embedded in the message is outdated according to the tag;
    forwarding the message to the scene engine, wherein the scene engine is a program executed by the first computing device, by the second computing device, or by a third computing device;
    optimizing the change information by finding common vertexes to reduce vertex count to reduce the complexity of the change in the 3D graphic object;
    wherein the change comprises at least one or more of: a scene change, a lighting change, a shader change, and a materials change; and
    wherein the complexity of the change in the 3D graphic object is further reduced by removing change information that is only relevant to the authoring tool.

2. The method of claim 1, further comprising discarding the message from the queue when the queue is full.

3. The method of claim 1, wherein the change is identified by using an application programming interface (API) of the authoring tool.

4. The method of claim 1, further comprising discarding the message from the queue when the message is not a high priority message.

5. The method of claim 1, wherein the message is forwarded to the scene engine through a network using a Transmission Control Protocol ("TCP") protocol.

6. The method of claim 1, wherein the authoring tool is one of a plurality of authoring tools, wherein the plurality of authoring tools are executed by a plurality of computing devices.

7. The method of claim 1, further comprising when the scene engine does not possess the scene information or the information of the 3D graphic object related to the change information, the scene engine requests scene information or information of 3D graphic object from content processor.

8. A 3D graphic object processing system comprising:
    at least one processing unit;
    a computer-readable storage medium having program instructions executable by the at least one processing unit;
    wherein the program instructions identify a change of at least one 3D graphic object, wherein the change is made by an authoring tool, wherein the authoring tool is a program executed by the 3D graphic object processing system or by a first computing device;
    wherein the program instructions create change information for the change;
    wherein the program instructions assign a unique identifier, wherein the unique identifier is an identifier assigned to the change;
    wherein the program instructions create a message, wherein the message is embedded with the change information, the unique identifier and a tag, wherein the tag is created by the content processor for categorizing the change and is used by the content processor or a scene engine to determine the type of the message;
    wherein the program instructions store the message in a queue when the message is not ready for forwarding to the scene engine after creation;
    and retrieves the message from the queue when the message is ready for forwarding to the scene engine;
    wherein the program instructions discard the message from the queue when the change embedded in the message is outdated according to the tag;
    wherein the program instructions forward the message to the scene engine, wherein the scene engine is a program executed by the system, by the first computing device or by a second computing device;
    wherein the program instructions optimize the change information by finding common vertexes to reduce vertex count to reduce the complexity of the change in the 3D graphic object;
    wherein the change comprises at least one or more of: a scene change, a lighting change, a shader change, and a materials change; and
    wherein the complexity of the change in the 3D graphic object is further reduced by removing change information that is only relevant to the authoring tool.

9. The system of claim 8, wherein the computer-readable storage medium further comprises program instructions executable by the at least one processing unit for discarding the message from the queue when the queue is full.

10. The system of claim 8, wherein the change is identified by using an API of the authoring tool.

11. The system of claim 8, wherein the computer-readable storage medium further comprises discarding the message from the queue when the message is not a high priority message.

12. The system of claim 8, wherein the message is forwarded to the scene engine through a network using TCP protocol.

13. The system of claim 8, wherein the authoring tool is one of a plurality of authoring tools, wherein the plurality of authoring tools are executed by a plurality of computing devices.

14. The system of claim 8, wherein the computer-readable storage medium further comprises when the scene engine does not possess the scene information or the information of the 3D graphic object related to the change information, the scene engine requests scene information or information of 3D graphic object from content processor.

\* \* \* \* \*